United States Patent [19]
Hoff

[11] Patent Number: 5,985,801
[45] Date of Patent: Nov. 16, 1999

[54] OIL-FREE WATER-SOLUBLE HYDROXYETHYL CELLULOSE LIQUID POLYMER DISPERSION

[75] Inventor: Michael H. Hoff, Houston, Tex.

[73] Assignee: Baroid Technology, Inc., Houston, Tex.

[21] Appl. No.: 08/729,470

[22] Filed: Oct. 11, 1996

Related U.S. Application Data

[60] Provisional application No. 60/005,394, Oct. 11, 1995.

[51] Int. Cl.$^6$ .............................. B01J 13/00; C08L 1/28; E21B 43/22
[52] U.S. Cl. .................. 507/216; 252/315.3; 252/363.5; 507/925
[58] Field of Search .............................. 106/193.1, 194.1, 106/194.2; 252/315.3; 507/215, 925, 216

[56] References Cited

U.S. PATENT DOCUMENTS

| | | | |
|---|---|---|---|
| 4,330,414 | 5/1982 | Hoover | 106/194.2 X |
| 4,582,614 | 4/1986 | House et al. | 252/363.5 X |
| 4,615,740 | 10/1986 | Pelezo et al. | 507/925 X |
| 4,622,153 | 11/1986 | Watson et al. | 252/363.5 X |
| 4,678,516 | 7/1987 | Alderman et al. | 106/194.2 X |
| 4,758,357 | 7/1988 | Hoff | 252/363.5 X |
| 4,762,625 | 8/1988 | Dadgar | 252/363.5 X |
| 4,799,962 | 1/1989 | Ahmed | 106/194.2 |
| 5,439,057 | 8/1995 | Weaver et al. | 507/216 X |

FOREIGN PATENT DOCUMENTS

| | | |
|---|---|---|
| 2271572 | 4/1994 | United Kingdom . |
| WO93/20139 | 10/1993 | WIPO . |

*Primary Examiner*—Richard D. Lovering
*Attorney, Agent, or Firm*—Browning Bushman

[57] ABSTRACT

The present invention is directed to an oil-free, water-soluble, liquid, polymer dispersion for use in thickening aqueous mediums, particularly completion and workover fluids used in the oil and gas drilling business. The dispersions of the present invention are comprised of hydroxyethyl cellulose and propylene glycol derivatives, preferably both propylene glycol polyether polyols and an aliphatic propylene glycol ether. Optionally these dispersions include water. Because of their low toxicity, these dispersions are particularly useful for drilling in offshore environments. These compositions rapidly disperse in and viscosity a variety of brines, including sea water and other light brines, with minimum shear and without fisheye formation.

21 Claims, 1 Drawing Sheet

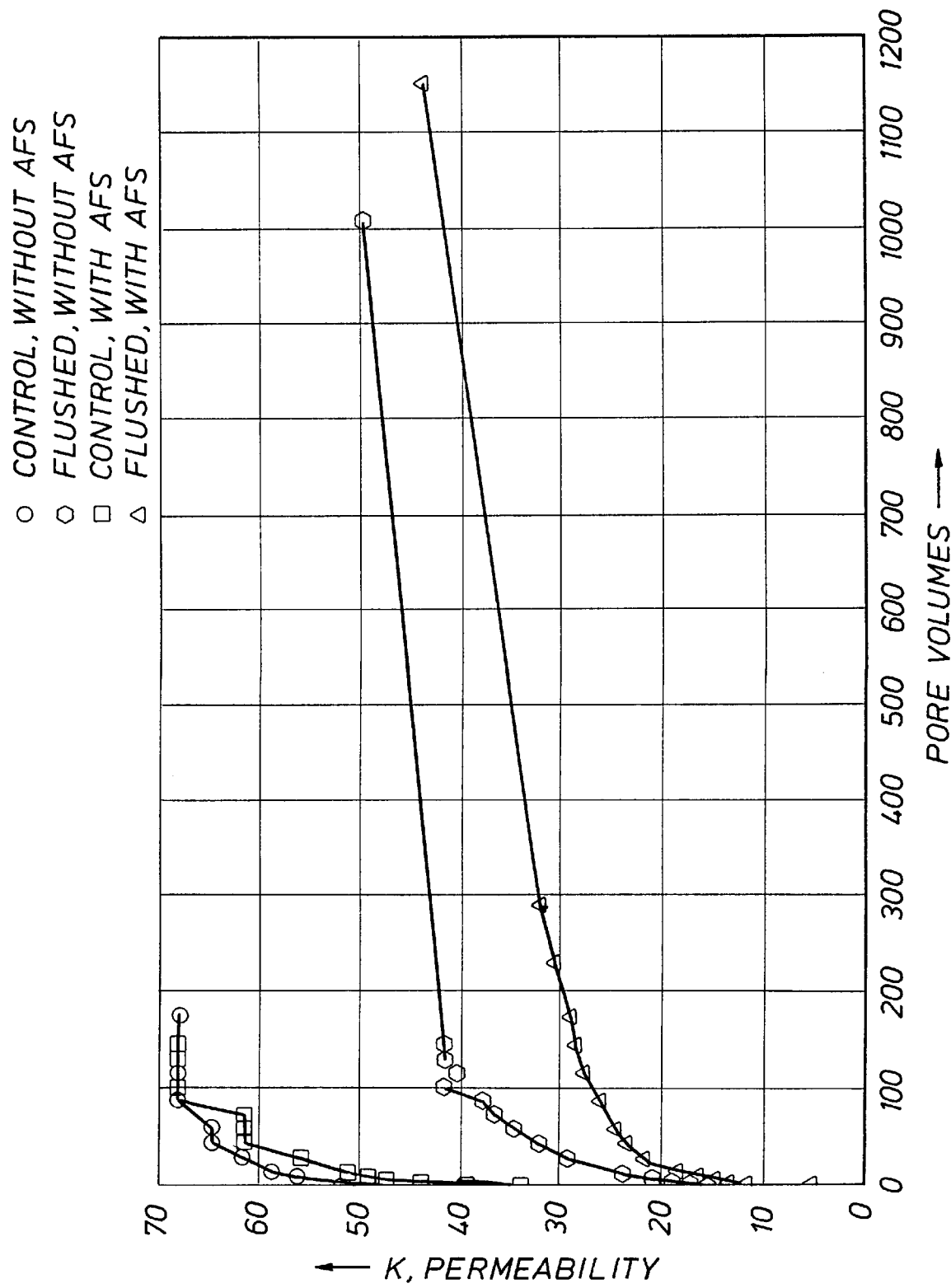

OIL-FREE WATER-SOLUBLE HYDROXYETHYL CELLULOSE LIQUID POLYMER DISPERSION

This application claims benefit from provisional application No. 60/005,394 filed Oct. 11, 1995.

BACKGROUND OF THE INVENTION

1. Field of the Invention

The present invention generally relates to compositions for use as thickening agents in aqueous systems and to aqueous well servicing fluids prepared therefrom. More specifically, the present invention relates to liquid, polymer-containing compositions for use as thickening agents to viscosify brines to provide thickened aqueous well drilling and treating fluids.

2. Description of the Background

The use of polymers in fluids, and particularly in brines, used in well drilling and treating fluids, to improve viscosity, solids removal and/or filtration control is well known. Hydroxyethyl cellulose (HEC) has typically been the preferred hydrophilic, polymeric material chosen to provide the desired thickening of brines in the oil and gas drilling industry. Compositions including HEC have long been used to viscosify drilling fluids, workover fluids, completion fluids, packer fluids, well treating fluids, subterranean formation treating fluids, spacer fluids, hole abandonment fluids and other aqueous fluids in which an increase in viscosity is desired.

Hydroxyethyl cellulose, however, does not come without its own problems. Attempts to directly incorporate HEC into a well servicing fluid as a dry powder result in the formation of fisheyes, i.e., unhydrated lumps of polymer which can result in operational problems. Potential problems include the blinding of shaker screens and the plugging of the formation.

Hydroxyethyl cellulose is not readily hydrated, solvated or dispersed in aqueous systems without the use of elevated temperatures and/or mixing under high shear for extended periods of time. In many cases, and particularly in workover operations, the equipment available for preparing the well servicing fluids does not readily lend itself to high temperature, high shear mixing. HEC polymers are particularly poorly hydrated, solvated or dispersed in aqueous solutions containing one or more water-soluble salts of multivalent cations such as heavy brines which are commonly used in well servicing fluids.

One successful attempt to solve these problems was disclosed in U.S. Pat. No. 4,330,414, incorporated herein by reference. The '414 patent disclosed a water miscible, polar, organic liquid for use as a solvating agent to form a semi-solid to viscous mixture with the hydroxyethyl cellulose.

In another approach to solving these problems, the polymer was added in the form of a solution, colloid or other suspension dispersed in a non-solvent carrier medium, e.g., an oil-based liquid such as diesel oil or kerosene. For example, see U.S. Pat. No. 4,622,153, incorporated herein by reference. However, it was found that compositions prepared in accord with the disclosure of the '153 patent experienced undesirable settling and hard packing of the HEC when stored under static conditions for extended periods of time. Resuspension and dispersion of the HEC was a time consuming process and required special equipment. Accordingly, solutions prepared in accord with the disclosure of the '153 patent were not conducive to use at on-site drilling, workover or completion operations.

Another effort to solve these problems was disclosed in U.S. Pat. No. 4,615,740, incorporated herein by reference. The '740 patent disclosed a liquid, polymer-containing composition for viscosifying oilfield brines including, in addition to hydroxyethyl cellulose, an oil-based liquid, an aluminum phosphate compound and optionally a surfactant.

While the thickening compositions described in the foregoing patents have been successful, changing times have created a need for new and improved thickening compositions. Environmental concerns, and particularly toxicity concerns, have arisen with respect to well servicing fluids including oil-based components such as those described above. As the number of offshore drilling operations has proliferated and as environmental concerns have increased, the continued use of these prior compositions has become unacceptable. Recent changes to the NPDES Offshore Discharge Permit requirements prohibit the discharge of fluids containing oil into offshore environments. The changes essentially prohibit the use of oil-containing products in offshore environments where discharge may occur. Accordingly, oil-free completion and workover fluids, including oil-free thickening agents, must be used in operations in environmentally sensitive areas covered by these regulations.

Therefore, there has developed a pressing need in the well servicing industry to develop and implement the use of safer and less toxic well servicing fluids. The present invention solves that need.

SUMMARY OF THE INVENTION

The present invention is directed to a flowable, polymer composition for thickening aqueous mediums and, particularly, to aqueous well servicing fluids including that composition. These liquid polymer compositions are particularly useful in thickening light brines used in workover and completion operations. These compositions advantageously provide safe thickeners characterized by reduced toxicity for effectively and rapidly viscosifying light brines, including saltwater, with minimum shear. These compositions are particularly favorable for use in environmentally sensitive areas such as drilling, completion and workover operations on offshore platforms.

The compositions of the liquid polymer dispersions of the present invention generally comprise hydroxyethyl cellulose and at least one water-soluble propylene glycol derivative having a molecular weight in the range of about 260–6000. Optionally these dispersions may include water. The propylene glycol derivative is selected from the group consisting of the propylene glycol polyether polyols, the aliphatic propylene glycol ethers and mixtures thereof. In a more preferred embodiment, at least two propylene glycol derivatives, a first derivative selected from the propyleneglycol polyether polyols and a second derivative selected from the aliphatic propylene glycol ethers, are included in the liquid polymer dispersion. The presently preferred propylene glycol polyether polyols are selected from the group consisting of polypropylene glycols having the formula

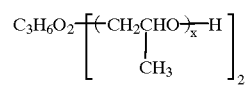

where x is about 2–50 and the polyoxypropylene polyols having the formula

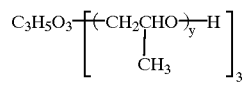

where y is about 1–32. The presently most preferred compositions include propylene glycol polyether polyols in accord with both of the foregoing formulae where x is 3 and y is 1, together with tripropylene glycol methyl ether, hydroxyethyl cellulose and water.

Well servicing fluids in accord with the present invention comprise an aqueous medium together with an effective amount of a thickening agent comprising a liquid, polymer composition in accord with the above formulations. The aqueous medium may comprise saltwater or other conventional light brines, including aqueous solutions of at least one water-soluble salt of a monovalent or a divalent ion. Typically, these salts include the chlorides and bromides of sodium, potassium and calcium, together with mixtures thereof. The liquid polymer dispersions of the present invention are particularly useful to effectively and safely thicken aqueous mediums having a density from about 8.5–13.5 pounds per gallon. While these dispersions may be used at the rate of about 1–10 pounds of dispersion per 42 gallon barrel of well servicing fluid, typically, only about 2–3 pounds per barrel are required for satisfactory results.

Liquid polymer dispersions prepared in accord with the foregoing formulations have exhibited 96 hour $LC_{50}$ values of 335,000 ppm at 10 pounds per barrel. Accordingly, dispersions and well servicing fluids prepared in accord with the present invention are significantly safer and less toxic than conventional oil-based compositions. Thus, the long felt but unfulfilled need in the oil and gas drilling and service industry for safer, less toxic thickeners and well servicing fluids has been met. These and other meritorious features and advantages of the present invention will be more fully appreciated from the following detailed description and claims.

BRIEF DESCRIPTION OF THE DRAWINGS

Other features and intended advantages of the present invention will be more readily apparent by the references to the following detailed description in connection with the accompanying drawing wherein the single FIGURE is a graphic illustration of the effect on permeability of a Berea sandstone core of amorphous fused silica in a composition of the present invention.

While the invention will be described with reference to the presently preferred embodiments, it will be understood that it is not intended to limit the invention to those embodiments. On the contrary, it is intended to cover all alternatives, modifications and equivalents as may be included in the spirit of the invention as defined in the appended claims.

DETAILED DESCRIPTION OF THE PREFERRED EMBODIMENTS

The present invention provides an oil-free, liquid, polymer dispersion for use in thickening well servicing fluids. The disclosed compositions are oil-free to the extent that they produce no sheen on the surface of seawater when discharged in an offshore environment. All of the components of these compositions are soluble or miscible with water. The compositions are pourable yet contain high polymer content, e.g., up to 40 percent-by-weight hydroxyethyl cellulose. Finally, the compositions of the present invention are stable during extended, static storage. The polymer has remained suspended in formulations prepared in accord with the present invention for a period of at least three months, at the conclusion of which no settling or packing was observed. These compositions rapidly disperse in seawater and other light brines without the formation of fisheyes. Finally, these compositions can effectively viscosify non-zinc brines with a minimum of shear.

Thickening compositions prepared in accord with the present invention and providing all of the foregoing advantages comprise hydroxyethyl cellulose, together with propylene glycol derivatives having a molecular weight from 260–6000. The preferred propylene glycol derivatives are the aliphatic propylene glycol ethers and the propylene glycol polyether polyols, more specifically the polypropylene glycols and polyoxypropylene polyols. The presently most preferred polyether polyols are the polypropylene glycols of the following formula

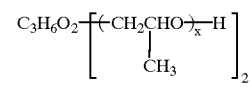

where x is about 2–50 and the polyoxypropylene polyols of the following formula

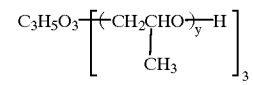

where y is about 1–32. The presently most preferred derivatives are the polyols of the foregoing formulae where x is 3 and y is 1 together with tripropylene glycol methyl ether. All of the propylene glycol derivatives are soluble in water and seawater.

In its broadest embodiment, the formulations of thickening dispersions in accord with the present invention may be summarized as follows:

TABLE 1

Broadest Formulations

| Composition, % by weight | Broad | Preferred | Optimum |
|---|---|---|---|
| hydroxyethyl cellulose | 10–40 | 30–40 | 35 |
| propylene glycol derivatives | 52–90 | 52–65 | 60 |
| water | 0–8 | 5–8 | 5 |

Formulations for more preferred embodiments of the present invention wherein the compositions include both an aliphatic propylene glycol ether and propylene glycol polyether polyols may be summarized as follows:

TABLE 2

Preferred Formulations

| Composition, % by weight | Broad | Preferred | Optimum |
|---|---|---|---|
| hydroxyethyl cellulose | 10–40 | 30–40 | 35 |
| propylene glycol polyether polyols | 22–85 | 28–45 | 40 |
| aliphatic propylene glycol ether | 5–30 | 20–24 | 20 |
| water | 0–8 | 5–8 | 5 |

Formulations for even more preferred embodiments including both a polypropylene glycol and a polyoxypropylene polyol, together with an aliphatic propylene glycol ether, may be summarized as follows:

TABLE 3

More Preferred Formulations

| Composition, % by weight | Broad | Preferred | Optimum |
|---|---|---|---|
| hydroxyethyl cellulose | 10–40 | 30–40 | 35 |
| propylene glycol | 10–75 | 18–25 | 25 |
| polyoxypropylene polyol | 5–35 | 10–20 | 15 |
| aliphatic propylene glycol ether | 5–30 | 20–24 | 20 |
| water | 0–8 | 5–8 | 5 |

Finally, formulations for the presently most preferred embodiments may be summarized as follows:

TABLE 4

Most Preferred Formulations

| Composition, % by weight | Broad | Preferred | Optimum |
|---|---|---|---|
| ARCOL ® POLYOL PPG-425 | 10–75 | 18–25 | 25 |
| ARCOL ® POLYOL LG-650 | 5–35 | 15 | 15 |
| ARCOSOLV ® TPM | 5–30 | 20–24 | 20 |
| Water | 0–8 | 5–8 | 5 |
| Aqualon HEC 250 HHRX | 10–40 | 35 | 35 |

Arcol and Arcosolv are trademarks of Arco Chemical.

The columns labeled Broad disclose the ranges of the various components that will produce a useable product. The formulations in the Broad column that do not fall in the Preferred column are deficient in one or more of three categories: the polymer activity may be too low for practical application, the composition may be too thick to be readily poured or the composition may not be stable for an extended period of time. The unstable formulations are, however, functional and will remain suspended and will function satisfactorily if used within a few days to a few weeks of preparation. The column labeled Preferred indicates the ranges of the various components which will produce useful compositions exhibiting good long term stability, with varying degrees of pourability. The optimum formulations have both good long term stability and are the most pourable of the recommended formulations.

Compositions prepared in accord with the present invention exhibit very low human and environmental toxicity. The 96-hour LC$_{50}$ at 10 lb/bbl for an exemplary composition prepared in accord with the present invention was 335,000 ppm. This value is a marked improvement over the values exhibited by two, conventional vicosifying agents: 106,700 ppm at 2.0 lb/bbl for BROMI-VIS® and 106,700 ppm at 8.0 lb/bbl for LIQUI-VIS NT. BROMI-VIS and LIQUI-VIS NT are registered trademarks of Baroid Technology, Inc. and represent products made in accord with U.S. Pat. Nos. 4,758,357 and 4,615,740, respectively.

The optimized formulations in Table 4 have been shown to be stable for at least four months. They did not settle or pack after static aging at ambient temperature during that time. While there was some liquid/solids separation, the separation was not sufficient to warrant further refinement of these new and improved compositions.

There are limitations associated with non-oil, hydrophilic solvent based systems for hydroxyethyl cellulose. Hydrophilic solvents tend to hydrate and swell the HEC excessively. This limits the solids content if pourability is desirable. In hydrophilic solvent systems where hydration and swelling are minimal or absent, suspension of the HEC in the solvent becomes a problem. An effective suspension agent added to the solvent should be acid soluble, compatible with the solvent and must not interfere with dispersion or yielding of the HEC. It is also desirable that all components of the formulation be of low toxicity.

An advantage of propylene glycol polyols is that they are less toxic than ethylene glycol polyols. Polyether polyols which are propylene glycol based, ranging in molecular weight from 260 to 6000, may be used in the compositions of the present invention. Two polyols, ARCOL PPG-425 and ARCOL LG-650, were employed in these tests. These polyols are soluble in water and, most importantly, infinitely soluble in seawater.

ARCOL PPG-425 is a 425 molecular weight polypropylene glycol. It is a propylene oxide adduct of diol starters. It has an average hydroxyl number of 263 and viscosity of 71 cps at 25° C. ARCOL LG-650 is a polyoxypropylene polyol. It is a propylene oxide adduct of triol starters. It has a molecular weight of 260, viscosity at 25° C. is 1059, and the average hydroxyl number is 650. These polyols are available from Arco Chemical Co., Inc.

The chemical structures for the chosen polyols are shown below:

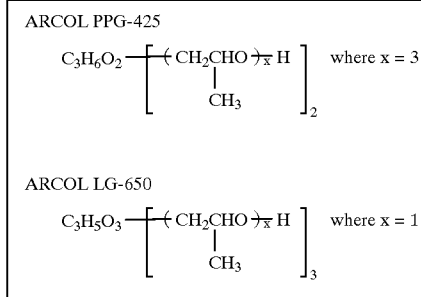

To determine the swelling effect of the polyols on HEC, one gram of HEC was combined with 9 grams of polyol. The HEC was thoroughly wetted with polyol and placed in a small glass vial. A sample of HEC and propylene glycol was also prepared for comparison, and the samples were examined after 24 hours. For each of the polyol samples, the HEC had settled and the liquid phase was clear. Comparing the polyols, the PPG-425 showed no noticeable swelling affect on the HEC, whereas the LG-650 caused the HEC to swell to more than double the volume the HEC occupied before hydration. The propylene glycol comparison sample had completely hydrated the HEC, to the extent that the HEC appeared to be partially solubilized. No free liquid was observed.

Initial samples were prepared using LG-650 and PPG-425 to develop a baseline understanding of how the polyols affected the HEC both separately, in combination and with water. Table 5 lists the formulations and observations of physical appearance. All samples were prepared as weight percent. The HEC content was set at 40 percent using Aqualon HEC 250 HHR.

Consistency was graded as thin, medium, medium-thick, thick and very thick. Pourability was graded as pourable, pourable (if stirred), marginally pourable (marginal) and not pourable (not). Syneresis refers to the amount of liquid/solid separation that occurs.

TABLE 5

Initial Samples and Physical Appearance

| Sample # | 1 | 2 | 3 | 4 | 5 | 6 | 7 |
|---|---|---|---|---|---|---|---|
| PPG-425 | — | 60 | 55 | 55 | 55 | 50 | 52 |
| LG-650 | 60 | — | 5 | — | 3 | 5 | 5 |
| Water | — | — | — | 5 | 2 | 5 | 3 |
| HEC 250HHR | 40 | 40 | 40 | 40 | 40 | 40 | 40 |
| *Observations after initial mix* | | | | | | | |
| Consistency | vry thick | medium | medium | vry thick | medium | vry thick | med thick |
| Pourability | marginal | pourable | pourable | pourable | pourable | marginal | pourable |
| *Observations after setting 24 hours* | | | | | | | |
| Consistency | solidified | settled | medium | vry thick | medium | vry thick | med thick |
| Pourability | not | if stirred | if stirred | marginal | pourable | marginal | pourable |
| Syneresis | none | 50% | 30% | 10% | 20% | 5% | 5% |

Samples with LG-650 greater than 5 percent (except for the sample at 60 percent) were not included in the above table because the resultant mixes were too thick for practical mixing in a plant situation. The appearance of samples 1 and 2 was as expected, based on the preliminary swelling tests. Sample 1 was initially marginally pourable, but solidified after setting for a few hours. When water at 5 percent was blended with PPG-425, the HEC was unevenly hydrated, producing a lumpy, grainy, non-homogeneous mixture. When LG-650 and water were mixed together, the rapid uneven hydration produced by water alone was not evident. Mixtures were evenly hydrated, producing smooth non-lumpy slurries. It appeared that the LG-650 prepared the HEC so that the water evenly hydrated the polymer surface. Water combined with LG-650 also reduced the degree of syneresis.

Samples 3 through 7 were tested in brines comprising 10 lb/gal sodium chloride and 11.6 lb/gal calcium chloride to determine their yield times under minimum shear conditions. A LIQUI-VIS sample was also tested for comparison. The test samples were added to brine while mixing at 600 RPM on a Fann® 35A rheometer. Fann is a registered trademark of Fann Instruments, Inc. Apparent viscosity was recorded at 30 minute intervals. The samples were then rolled overnight at 150° F. to determine their ultimate viscosity. Each sample was tested at 2 lb/bbl active polymer. Results are recorded in Tables 6 and 7.

TABLE 6

Viscosification of 10 lb/gal Sodium Chloride
Using a Fann 35A Rheometer at 600 RPM
Reading in Apparent Viscosity, cp

| Stir time at 600 RPM | LIQUI-VIS | #3 | #4 | #5 | #6 | #7 |
|---|---|---|---|---|---|---|
| 0 min | 2 | 2 | 2 | 2 | 2 | 2 |
| 30 min | 2.5 | 2.5 | 3 | 3 | 3 | 3 |
| 60 min | 2.5 | 7 | 33 | 22 | 18 | 31.5 |
| 90 min | 3 | 46 | 46.5 | 46 | 47.5 | 47 |
| 120 min | 7.5 | 47.5 | 47.5 | 46 | 48.5 | 48.5 |
| After 150° F. | 41.5 | 49.5 | 48.5 | 49.5 | 50 | 51 |

The results presented in Table 6 are a bit surprising. As expected, LIQUI-VIS failed to viscosify the brine after 2 hours of mixing. In sodium chloride brine, the HHR variety of HEC (used in LIQUI-VIS and the polyol samples) required a small amount of caustic (less than ¼ lb/bbl, not added here) to initiate polymer yield in the absence of heat. What was surprising was that the samples prepared with polyols yielded without the addition of caustic.

TABLE 7

Viscosification of 11.6 lb/gal Calcium Chloride
Using a Fann 35A Rheometer at 600 RPM
Reading in Apparent Viscosity, cp

| Stir time at 600 RPM | LIQUI-VIS | #3 | #4 | #5 | #6 | #7 |
|---|---|---|---|---|---|---|
| 0 min | 8.5 | 8.5 | 8.5 | 8.5 | 8.5 | 8.5 |
| 30 min | 31.5 | 39 | 43.5 | 37.5 | 44.5 | 40.5 |
| 60 min | 50 | 62 | 69 | 57.5 | 70 | 68 |
| 90 min | 64 | 74 | 80 | 72.5 | 82 | 80 |
| 120 min | 73.5 | 82.5 | 88 | 82.5 | 89.5 | 88 |
| After 150° F. | 109 | 105 | 108.5 | 106.5 | 105.5 | 106 |

In calcium chloride, the polyol samples viscosify the brine at a slightly faster rate than LIQUI-VIS. It may be that the rate of hydration in LIQUI-VIS is influenced by the time it takes water to displace the oil that coats the polymer.

It was suspected there might be some dispersion problems with the polyol samples due to their extreme hydrophilic nature. This was the case in the very thick samples. They did tend to produce a few hydrated gel structures. As expected, sample 4, prepared with water and no LG-650, produced the most hydrated gel cells. Medium thick samples produced a few very small hydrated gel cells and medium consistency samples were, for the most part, free of gel cells.

Only one of the formulations was selected for further testing in applicable brines. Sample 7 was selected because of its performance, consistency, pourability and syneresis characteristics. It was compared with LIQUI-VIS in seawater, 11.0 lb/gal potassium bromide and 12.5 lb/gal sodium bromide. Although LIQUI-VIS is not normally used in calcium bromide brines, it was included to see if a polyol based sample would perform to any advantage. Test concentration was 2 lb/bbl active. Results are shown in Table 8.

TABLE 8

Viscosification of Various Brines
Comparison Between Polyol Sample #7 and LIQUI-VIS

| Stir time at 600 RPM | Seawater #7 | LIQUI-VIS | 11.0 lb/gal KBr #7 | LIQUI-VIS | 12.5 lb/gal NaBr #7 | LIQUI-VIS | 142.2 lb/gal CaBr$_2$ #7 | LIQUI-VIS |
|---|---|---|---|---|---|---|---|---|
| 0 min | 1 | 1 | 1 | 1 | 2 | 2 | 7 | 7 |
| 30 min | 43.5 | 40 | 1.5 | 1.5 | 30 | 4.5 | 7.5 | 7 |
| 60 min | 45 | 42 | 2.5 | 1.5 | 46.5 | 26.5 | 9.8 | 7.5 |
| 90 min | 45 | 42.5 | 22.5 | 6.5 | 49.5 | 42.5 | 13.5 | 9 |
| 120 min | 45 | 42.5 | 36.5 | 37 | 50.5 | 45 | 24 | 14.5 |
| After 150° F. | 44.5 | 42 | 39.5 | 41.5 | 57.5 | 55 | 99 | 104.5 |

The data in Table 8 showed the polyol formulation to be equal to or better than LIQUI-VIS in each brine. It is interesting to note that the polyol formulation significantly out-performed LIQUI-VIS in the calcium bromide brine.

After the polyol samples had set for approximately one week, an increase in syneresis was observed, together with some settling of the HEC polymer. This problem needed to be addressed. Additionally, the presence of gel cells, i.e., fisheyes, was still a concern. It was also desirable to increase the rate of viscosification, ideally so that at least 80 percent of the hot rolled viscosity would be achieved after 60 minutes of mixing.

It was thought that perhaps a propylene glycol ether might perform as a carrier fluid and dispersant in view of the use of ethylene glycol monobutyl ether for a similar purpose in the BROMI-VIS product. Arco can supply several propylene based glycol ethers. Arcosolv TPM is a tripropylene glycol methyl ether that is water soluble, possesses low toxicological properties and has a high flash point. TPM has a very low viscosity, i.e., only 5.6 cps at 25° F. In order to make a formulation capable of suspending the HEC, several changes were made to the basic formulations previously tested. PPG-425 was eliminated and the concentration of LG-650 was greatly increased. Amorphous fused silica (AFS) was also included.

TABLE 9

Modified Polyol Formulation Containing TPM

| Composition, % by weight | XLQ-22A |
|---|---|
| LG-650 | 39.25 |
| TPM | 20 |
| AFS | 0.75 |
| HEC 250HHW | 40 |
| Consistency | medium-thick |
| Pourability | pourable |
| Syneresis | none |

The formulation was tested in a variety of brines to determine the effect of TPM on dispersibility. The tests were run at 2 lb/bbl active polymer and mixing was performed on a Fann 35A rheometer at 600 RPM. The sample designation was XLQ-22A. The results are presented in Table 10.

TABLE 10

Effect Of TPM On Dispersion And Viscosification In Various Brines
*Data Is Apparent Viscosity, cp*

| Stir time, min at 600 RPM | Seawater | 10 lb/gal NaCl | 11.6 lb/gal CaCl$_2$ |
|---|---|---|---|
| 0 | 1 | 2 | 8.5 |
| 15 | 42 | 47 | 34.5 |
| 30 | 42 | 47 | 55 |
| 60 | 42 | 48 | 70 |
| 90 | 42 | 48 | 81 |
| 120 | 42 | 47 | 87 |
| Rolled 150° F. | 41.5 | 48 | 111.5 |

The data indicates that TPM functions as a highly effective dispersant. In seawater and 10 lb/gal sodium chloride, 100 percent of the hot rolled viscosity was achieved within 15 minutes. In 11.6 lb/gal calcium chloride the viscosification rate was roughly double that seen with previous formulations, achieving 63 percent of hot rolled viscosity after 1 hour and 78 percent after 2 hours. It should be noted that although XLQ-22A was a pourable dispersion immediately after preparation, when allowed to set overnight the sample set up, absorbing all the liquid phase and becoming semi-solid.

A new series of samples containing TPM were prepared. In this series, the LG-650 and AFS were altered in an effort to make a more pourable suspension.

TABLE 11

Stability and Pourability of Formulations Containing TPM

| Quiescent 24 hrs | XLQ-22B | XLQ-22C | XLQ-22D | LXQ-22E |
|---|---|---|---|---|
| LG-650 | 29.25 | 29.50 | 29.0 | 14 |
| TPM | 30 | 30 | 30 | 40 |
| AFS | 0.75 | 0.50 | 1.0 | 1.0 |
| HEC 250HHW | 40 | 40 | 40 | 45 |
| Consistency | thin | thin | thin | very thin |
| Pourability | pourable | pourable | pourable | pourable |
| Syneresis | none | <2% | none | none |

Samples 22B, 22C, and 22E started settling after 5 days. Sample 22D looked good at 10 days, but some settling of the HEC was becoming evident.

Aqualon hydroxyethyl celluloses are designated with either a W or an R suffix. The R suffix indicates that the HEC has been treated with a dialdehyde, glyoxal. This organic delays the hydration of HEC, so that it will disperse more thoroughly before it begins to hydrate and swell. The W suffix indicates that the HEC has not been treated to delay hydration.

The formulations developed in accord with the present invention with R type HEC disperse in all brines and freshwater without fisheye formation. However, in some of the brines, specifically sodium chloride, sodium bromide, potassium chloride and potassium bromide, the rate of viscosification is slow. This slow viscosification can be overcome by adding one-quarter pound per barrel or less of caustic to the brine. On the other hand when the W type HEC is used in these same brines, dispersion is excellent and viscosification is very rapid. In seawater and freshwater, however, the W type HEC does not disperse well. Fisheyes and polymer stringers are evident. A closer look at the dispersion characteristics of type W revealed that dispersion was related to salinity. The salinity of a fluid must be greater than about 40,000 to 50,000 ppm for the W type HEC to disperse without fisheye formation. Because it would be more desirable, and in most cases practical, to add caustic to a brine than to cut sack salt to increase salinity of the fluid, the R type HEC is preferred.

Further tests established that amorphous fused silica had a definite affect on return permeability. A sample of XLQ-22D with and without AFS was prepared. The test was run using standard Berea sandstone cores. The results are presented in the single FIGURE. Return permeability was reduced by approximately 32 percent relative to that of the sample without AFS. Thus, it was determined that AFS should not be used in the polyol formulations as a suspending agent.

Finally, samples of the most preferred embodiment containing the two polyols, TPM and water were prepared with 35 percent HEC. The formulations with comments and observations of their physical appearance over a 4 week period are summarized in Table 12.

TABLE 12

35% HEC Formulations Containing Polyols and Water

| Formulations | XLQ-49A | XLQ-49B | XLQ-48C | XLQ-49D | XLQ-49E | XLQ-49F |
|---|---|---|---|---|---|---|
| PPG-425 | 35 | 33 | 31 | 29 | 25 | 22 |
| LG-650 | 5 | 7 | 9 | 9 | 15 | 15 |
| Water | 5 | 5 | 5 | 7 | 5 | 8 |
| TPM | 20 | 20 | 20 | 20 | 20 | 20 |
| HEC 250HHRX | 35 | 35 | 35 | 35 | 35 | 35 |
| Quiescent 24 hours | | | | | | |
| Consistency | thin | thin-medium | thin-medium | medium | medium | very thick |
| Pourability | pourable | pourable | pourable | pourable | pourable | marginal |
| Syneresis | 10% | 10% | 5–10% | 5% | 5% | 5% |
| Quiescent 1 week | | | | | | |
| Syneresis | 15% | 15% | <10% | 10% | 5% | <5% |
| Comments | soft texture, no packing evident | slt. firming of consistency | slt. firming of consistency | slt. firming of consistency | soft texture, no settling | no settling |
| Quiescent 2 weeks | | | | | | |
| Syneresis | 15% | 15% | 10% | 10% | 5% | 5% |
| Comments | soft texture, no packing evident | firming settling | slt. firming of consistency | firming, not packed | no settling | no settling |
| Quiescent 3 weeks | | | | | | |
| Syneresis | 20% | — | 15% | 10% | 5% | 5% |
| Comments | firming slt. packing | — | firm, but not packed | firm, not packed | no settling | no settling |
| Quiescent 3 weeks | | | | | | |
| Syneresis | 20% | — | 20% | 15% | 5% | 5% |
| Comments | firming packed | — | firm, soft packed | firm, not packed | no settling | no settling |

The data indicates that samples 49E and 49F, with LG-650 at 15 percent and water between 5 and 8 percent, produce excellent samples with minimal syneresis and no settling at 4 weeks. Sample 49F is very thick, however, and only marginally pourable.

The following samples were prepared for use in extended static aging studies.

TABLE 13

15% LG-650 Samples For Extended Aging Study

| Quiescent 24 hrs | XLQ-53A | XLQ-53B | XLQ-53C | XLQ-53D | XLQ-53E |
|---|---|---|---|---|---|
| PPG-425 | 22 | 20 | 18 | 25 | 24 |
| LG-650 | 15 | 15 | 15 | 15 | 15 |
| Water | 8 | 8 | 8 | 5 | 6 |

TABLE 13-continued

15% LG-650 Samples For Extended Aging Study

| Quiescent 24 hrs | XLQ-53A | XLQ-53B | XLQ-53C | XLQ-53D | XLQ-53E |
|---|---|---|---|---|---|
| TPM | 20 | 22 | 24 | 20 | 20 |
| 250 HHRX | 35 | 35 | 35 | 35 | 35 |
| Consistency | very thick | very thick | thick | medium | medium thick |
| Pourability | marginal | marginal | marginal | pourable | pourable |
| Syneresis | none | none | none | 5% | <5% |

Formulation XLQ-53E was prepared with four different HEC types to determine the effect on consistency of the sample as a function of the HEC type. These samples were also static aged for an extended time period. None of the samples in Table 13 exhibited any settling of HEC for the 16 week test period. Samples XLQ-53A through 53C showed no syneresis, while 53D and 53E each had less than 5 percent syneresis. Samples XLQ-53A through 53C remained very thick. They were not free flowing dispersions, but could be made to flow from their containers. Dispersibility and viscosification were not affected by the thickness of the samples. While samples 53D and 53E were also thick, they were pourable after minimal hand mixing to restore their fluid character.

Samples were prepared using different HEC polymers. As previously mentioned, type R has been treated with a hydration retarder, type W has not. The X designation refers to grind size. Polymers with the X designation are a finer grind size than those without the designation.

TABLE 14

Effect of HEC Type On Formulation Consistency
All Formulations Same As XLQ-53E Except for HEC Type

| Quiescent 24 hrs | XLQ-53E | XLQ-53F | XLQ-54D | XLQ-54E |
|---|---|---|---|---|
| HEC Type | 250 HHRX | 210 HHR | 210 HHW | 250 HHW |
| Consistency | medium thick | medium | medium thick | thin |
| Pourability | pourable | pourable | pourable | pourable |
| Syneresis | <5% | 5% | 5% | 10% |

Examination of the four types of HEC in Table 14 showed that 250 HHRX is the polymer of choice. Sample XLQ-53E containing the 250 HHRX remained stable during the 16 week test period. The other HECs were not as stable, exhibiting settling of the HEC after five to seven weeks. It would seem that the finer grind size of the HEC is beneficial with respect to suspension of the polymer.

XLQ-53D was examined for viscosification efficiency in several brines. The results are shown in Table 15.

TABLE 15

Viscosification of Various Brines
Using XLQ-53D at 2 lb/bbl Active Polymer

| Stir time on Fann 35A at 600 RPM, min | Seawater | 10 ppg NaCl | 10% KCl | 11.0 ppg KBr | 12.3 ppg NaBr | 11.6 ppg CaCl$_2$ |
|---|---|---|---|---|---|---|
| 0 min | 1 | 2 | 1 | 1 | 2 | 8.5 |
| 15 min | 36.5 | 43.5 | 28 | 35 | 45 | 48.5 |
| 30 min | 36.5 | 45.5 | 32.5 | 35 | 48 | 77.5 |
| 45 min | 36 | 45 | 36 | 35 | 48.5 | 88 |
| 60 min | 36 | 45 | 37 | 35 | 48.5 | 91 |
| After rolling 150° F. overnight | 35 | 43 | 33 | 32 | 50.5 | 95 |
| % yield, 30 min | *illegible* | *illegible* | *illegible* | *illegible* | *illegible* | *illegible* |
| % yield, 60 min | *illegible* | *illegible* | *illegible* | *illegible* | *illegible* | *illegible* |
| 0.1 lb/bbl caustic added | no | yes | yes | yes | yes | no |

Caustic was added to brines prior to addition of the viscosifier where noted. Values are apparent viscosity (cp). For comparison, similar results using LIQUI-VIS NT are shown in Table 16.

TABLE 16

Viscosification of Various Brines
Using LIQUI-VIS NT at 2 lb/bbl Active Polymer

| Stir time on Fann 35A at 600 RPM, min | Seawater | 10 ppg NaCl | 10% KCl | 11.0 ppg KBr | 12.3 ppg NaBr | 11.6 ppg CaCl$_2$ |
|---|---|---|---|---|---|---|
| 0 min | 1 | 2 | 1 | 1 | 2 | 8.5 |
| 15 min | 35.5 | 35.5 | 31 | 31 | 35 | 31 |
| 30 min | 39 | 41 | 35.5 | 34.5 | 42.5 | 47 |
| 45 min | 40 | 43.5 | 36.5 | 36.5 | 45.5 | 59 |
| 60 min | 40 | 46 | 36.5 | 36.5 | 47 | 66 |
| After rolling 150° F. overnight | 38 | 44 | 35.5 | 34.5 | 51.5 | 103 |
| % yield, 30 min | 102% | 93% | 100% | 100% | 82.5% | 45.6% |
| % yield, 60 min | 105% | 104% | 103% | 106% | 91.2% | 64.1% |
| 0.1 lb/bbl caustic added | no | yes | yes | yes | yes | no |

The foregoing description of the invention has been directed in primary part to particular preferred embodiments in accord with the requirements of the Patent Statute and for purpose of explanation and illustration only. It will be apparent to those skilled in the art that many modifications and changes in these specifically described compositions may be made without departing from the true scope and spirit of the invention. Therefore, the invention is not restricted to the preferred embodiments described and illustrated but covers all modifications which may fall within the scope of the following claims.

What is claimed is:

1. A flowable, polymer composition for thickening aqueous mediums, comprising:

hydroxyethyl cellulose;

a polypropylene glycol having the formula

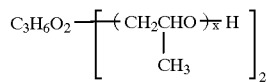

where x is about 2–50;

a polyoxypropylene polyol having the formula

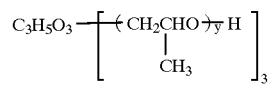

where y is about 1–32;

an aliphatic propylene glycol ether; and optionally water.

2. The composition of claim 1 wherein x is 3, y is 1 and said aliphatic propylene glycol ether is tripropylene glycol methyl ether.

3. The composition of claim 2, comprising:
about 10–40 percent-by-weight hydroxyethyl cellulose;
about 10–75 percent-by-weight polypropylene glycol;
about 5–35 percent-by-weight polyoxypropylene polyol;
about 5–30 percent-by-weight tripropylene glycol methyl ether; and
about 0–8 percent-by-weight water.

4. The composition of claim 2, comprising:
about 30–40 percent-by-weight hydroxyethyl cellulose;
about 18–25 percent-by-weight polypropylene glycol;
about 10–20 percent-by-weight polyoxypropylene polyol;
about 20–24 percent-by-weight tripropylene glycol methyl ether; and
about 5–8 percent-by-weight water.

5. The composition of claim 2, comprising:
about 35 percent-by-weight hydroxyethyl cellulose;
about 25 percent-by-weight polypropylene glycol;
about 15 percent-by-weight polyoxypropylene polyol;
about 20 percent-by-weight tripropylene glycol methyl ether; and
about 5 percent-by-weight water.

6. A flowable, polymer composition for thickening aqueous mediums, comprising:

hydroxyethyl cellulose;

at least one water soluble propylene glycol derivative having a molecular weight in the range of about 260–6000 and selected from the group consisting of polypropylene glycols having the formula

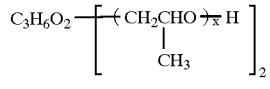

where x is about 2–50, polyoxypropylene polyols having the formula

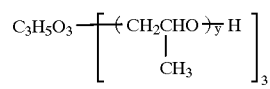

where y is about 1–32, aliphatic propylene glycol ethers and mixtures thereof; and optionally water.

7. The composition of claim 6, comprising:
about 10–40 percent-by-weight hydroxyethyl cellulose;
about 52–90 percent-by-weight propylene glycol derivative; and
about 0–8 percent-by-weight water.

8. The composition of claim 6, comprising:
about 30–40 percent-by-weight hydroxyethyl cellulose;
about 52–65 percent-by-weight propylene glycol derivative; and
about 5–8 percent-weight-by water.

9. The composition of claim 6, comprising at least two propylene glycol derivatives, a first derivative selected from the group consisting of the propylene glycol polyether polyols and a second derivative selected from the group consisting of the aliphatic propylene glycol ethers.

10. The composition of claim 9, comprising:
about 10–40 percent-by-weight hydroxyethyl cellulose;
about 22–85 percent-by-weight propylene glycol polyether polyol;
about 5–30 percent-by-weight aliphatic propylene glycol ether; and
about 0–8 percent-by-weight water.

11. The composition of claim 9, comprising:
about 30–40 percent-by-weight hydroxyethyl cellulose;
about 28–45 percent-by-weight propylene glycol polyether polyol;
about 20–24 percent-by-weight aliphatic propylene glycol ether; and
about 5–8 percent-by-weight water.

12. The composition of claim 6, comprising at least one polypropylene glycol and at least one polyoxypropylene polyol.

13. The composition of claim 12, comprising:
about 10–40 percent-by-weight hydroxyethyl cellulose;
about 10–75 percent-by-weight polypropylene glycol;
about 5–35 percent-by-weight polyoxypropylene polyol;
about 5–30 percent-by-weight aliphatic propylene glycol ether; and
about 0–8 percent-by-weight water.

14. The composition of claim 12, comprising:
about 30–40 percent-by-weight hydroxyethyl cellulose;
about 18–25 percent-by-weight polypropylene glycol;
about 10–20 percent-by-weight polyoxypropylene polyol;
about 20–24 percent-by-weight aliphatic propylene glycol ether; and
about 5–8 percent-by-weight water.

15. The composition of claim 12, comprising:
about 35 percent-by-weight hydroxyethyl cellulose;
about 25 percent-by-weight polypropylene glycol;
about 15 percent-by-weight polyoxypropylene polyol;

about 20 percent-by-weight aliphatic propylene glycol ether; and about 5 percent-by-weight water.

16. A well servicing fluid, comprising:

an aqueous medium and an effective amount of a thickening agent selected from the group consisting of the compositions defined in any of claims 2, 5, 7, 8, 9, 10, 12–15, 1 and 6.

17. The well servicing fluid of claim 16 wherein said aqueous medium is saltwater.

18. The well servicing fluid of claim 16 wherein said aqueous medium comprises a solution of at least one water-soluble salt of a monovalent or divalent metal ion.

19. The well servicing fluid of claim 18 wherein said salt is selected from the group consisting of sodium chloride, sodium bromide, potassium chloride, potassium bromide, calcium chloride, calcium bromide and mixtures thereof.

20. The well servicing fluid of claim 16 wherein said aqueous medium has a density between about 8.5 and about 13.5 pounds per gallon.

21. The well servicing fluid of claim 16, comprising from about 1–10 pounds of said thickening agent per 42 gallon barrel of said fluid.

* * * * *

UNITED STATES PATENT AND TRADEMARK OFFICE
CERTIFICATE OF CORRECTION

PATENT NO.    : 5,985,801
DATED         : November 16, 1999
INVENTOR(S)   : Hoff, Michael H.

It is certified that error appears in the above-identified patent and that said Letters Patent is hereby corrected as shown below:

Column 17,
Lines 9 and 10, change "claims 2, 5, 7, 8, 9, 10, 12-15, 1 and 6" to
-- claims 1-15 --.

Signed and Sealed this

Fifth Day of August, 2003

JAMES E. ROGAN
*Director of the United States Patent and Trademark Office*